United States Patent [19]
Yang

[11] Patent Number: 5,247,238
[45] Date of Patent: Sep. 21, 1993

[54] BATTERY CHARGER AUTOMATIC CUT-OFF CIRCUIT

[76] Inventor: Tai-Her Yang, 5-1 Taipin St., Si-Hu Town, Dzan-Hwa, Taiwan

[21] Appl. No.: 861,392

[22] Filed: Mar. 31, 1992

[30] Foreign Application Priority Data

Apr. 5, 1991 [GB] United Kingdom ............... 9107105

[51] Int. Cl.$^5$ ............................................. H02J 7/04
[52] U.S. Cl. ..................................... 320/35; 320/59; 320/DIG. 2
[58] Field of Search ............. 320/35, 36, 59, DIG. 2

[56] References Cited

U.S. PATENT DOCUMENTS

| | | | |
|---|---|---|---|
| 3,911,351 | 10/1975 | Saslow | 320/35 X |
| 4,240,022 | 8/1980 | Kilinskis et al. | 320/35 X |
| 4,528,492 | 7/1985 | Inaniwa et al. | 320/36 |
| 4,623,832 | 11/1986 | Fujiwara | 320/36 X |
| 4,686,444 | 8/1987 | Park | 320/35 X |
| 4,712,055 | 12/1987 | Houser, Jr. | 320/35 |
| 4,853,607 | 8/1989 | Walter et al. | 320/36 |
| 4,998,056 | 3/1991 | Cole | 320/35 |

Primary Examiner—R. J. Hickey
Attorney, Agent, or Firm—Bacon & Thomas

[57] ABSTRACT

A battery charging circuit is provided with a thermally controlled cut-off switch whose normally closed contacts are in series with the main terminals of a thyristor. The thyristor is switched ON on commencement of battery charging by the charging of a capacitor C1, which remains charged even when the contacts of the cut-off switch open as a result of the battery temperature rising upon completion of charging. Consequently, the thyristor remains latched OFF by the capacitor even when the contacts of the cut-off switch close, and can only be turned ON again by disconnecting the battery or power supply, disconnection of the battery or power supply causing capacitor C1 to discharge through a charge maintenance by-pass circuit connected in parallel with the thermal switch and thyristor.

3 Claims, 1 Drawing Sheet

BATTERY CHARGER AUTOMATIC CUT-OFF CIRCUIT

BACKGROUND OF THE INVENTION

1. Field of the Invention

This invention relates to a battery charger.

2. Description of Related Art

A battery charger with an automatic charging cut-off circuit are described in copending U.S. application Ser. No. 07/861,392, filed Mar. 31, 1992.

In general, such automatic charging cut-off circuits include a temperature control switch which opens when the battery charge approaches a predetermined limit (e.g., 0.1 C or 10% current of rated AH) and the battery gets too hot. The charger described in copening U.S. application Ser. No. 07/861,392 uses such a temperature sensitive switch and further includes a mechanical/magnetic latch for preventing the switch from closing until removal of the battery after charging. The present invention provides an electronic latch circuit for the same purpose.

SUMMARY OF THE INVENTION

The present invention addresses the problem that conventional charge circuits are complicated in structure, which prevents production from being reliably accomplished at reasonable cost. In particular, the present invention relates to a circuit made up of a charge maintenance and latch circuit for preventing charging of a rechargeable battery via a temperature controlled switch even after the switch has reset following charging, and further to a feedback diode for providing an automatic emergency power supply function.

DETAILED DESCRIPTION OF THE PREFERRED EMBODIMENT

Figure 1:
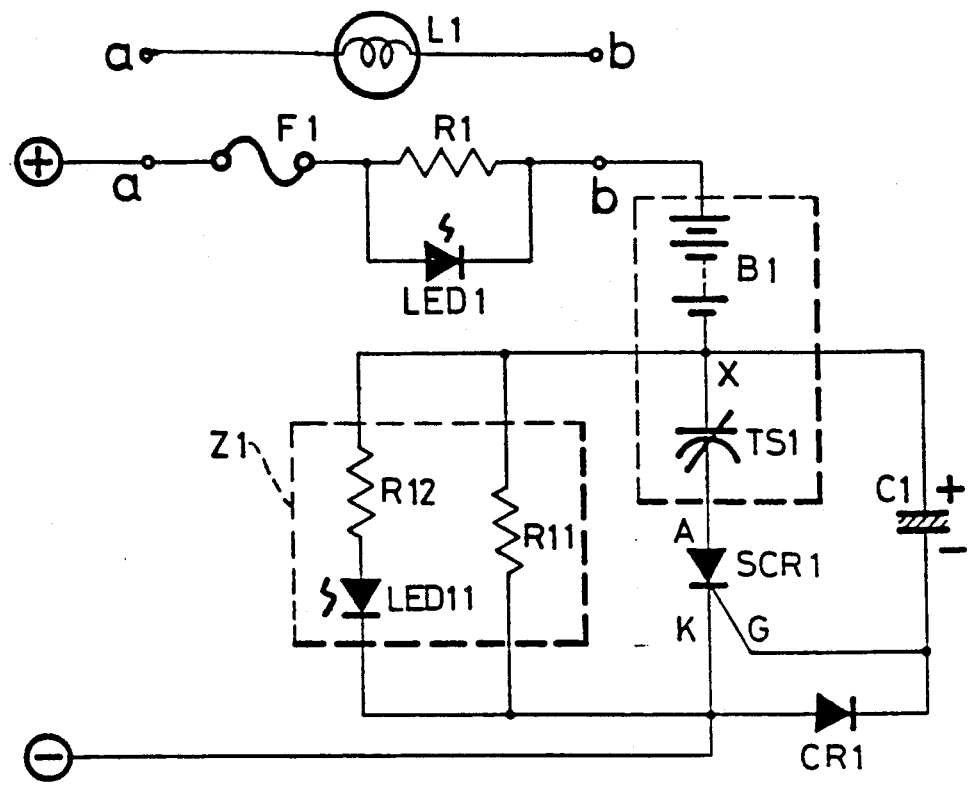
FIG. 1 shows a preferred automatic battery charging cut-off circuit including a temperature control switch, a latch circuit for the switch, and a charge-maintaining switch by-pass circuit.

The circuit shown in FIG. 1 includes a charge maintenance and latch circuit which cooperates with a temperature controlled switch for controlling the charge on a battery as operational conditions require. The power supply is a DC, half wave rectified, full wave rectified, intermittent pulse or weeping-wave DC power supply connected to charge a rechargeable battery. The battery is supplied with charging current via a normally closed temperature control switch. A charge maintenance circuit is controlled by the temperature controlled switch. When the temperature of the rechargeable battery rises, the temperature controlled switch opens. After opening, a maintenance current is supplied to the battery by means of a by-pass branch circuit until the power supply is turned OFF or the battery is removed and the charging circuit is interrupted.

FIG. 1 shows in detail a first embodiment of the preferred automatic charging cut-off and charge maintenance circuit of the invention. The circuit includes a rechargeable battery B1 and a normally closed temperature controlled switch TS1 on rechargeable battery B1. The circuit further includes a limiting resistance R1 connected in parallel with a light emitting diode LED1 for indicating that the battery is charging, and a series connected short-circuit protective element (fuse) F1. The battery B1 is also connected in series with both the normally closed temperature sensitive switch TS1 and a thyristor SCR1 leading to the DC charging power supply. The limiting resistance R1, LED1 for the charging display, and protective element F1 may be replaced by a filament type lamp L1, also as shown in FIG. 1.

A trigger capacitance C1 includes a positive terminal connected to a common connection x between the negative terminal of rechargeable battery B1 and normally closed temperature control switch TS1. The negative terminal of capacitor C1 is connected to trigger gate G of thyristor SCR.

By-pass branch element Z1 includes limiting resistance R12 connected in parallel with branch resistance R11 and light conducting diode LED11 for indicating that a charge maintenance current is present. The impedance of capacitor C1 and element Z1 are chosen to close thyristor SCR1 and at the same time maintain a small current which provides a topping charge for the battery.

A discharge diode CR1 is connected in parallel between the negative gate K of thyristor SCR1 and trigger gate G, the polarity of which enables the diode CR1 to pass current when the battery is removed or the power supply is otherwise cut-off, enabling current from capacitor C1 to discharge through by-pass branch element Z1 and the diode CR1.

The operative sequences of the circuit of FIG. 1 are as follows:

When the battery B1 is fully charged, and the temperature has risen to the point where the temperature controlled switch TS1 opens and the thyristor SCR1 is cut off accordingly, the charging current is limited by by-pass branch element Z1 to enable the battery to maintain a full charge due to the small current supplied by by-pass branch element Z1, and the value of voltage of the trigger capacitance C1 is identical to the end voltage of by-pass branch element Z1.

When temperature controlled switch TS1 returns to its original closed position due to a temperature drop, the voltage on the capacitor maintains the OFF state of the thyristor SCR1. When the battery B1 is removed, the trigger capacitance C1 will discharge through by-pass branch element Z1 and discharge diode CR1, after which SCR1 returns to a trigger standby state.

Figure 2:
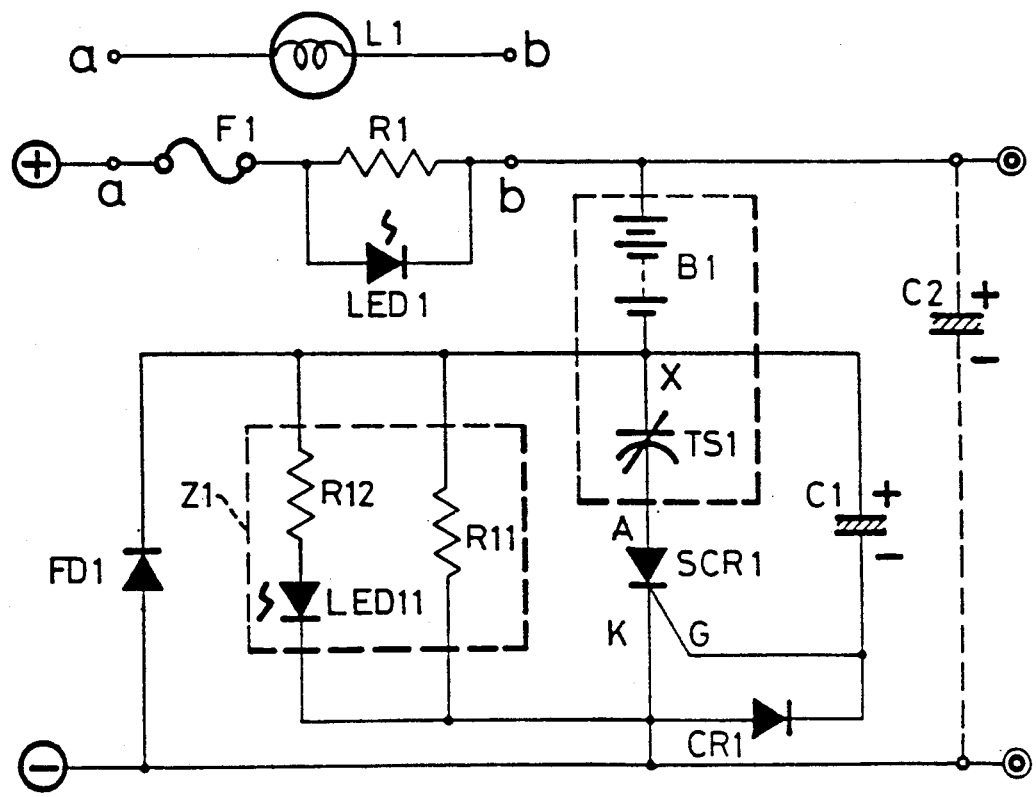
FIG. 2 shows an embodiment of the circuit of FIG. 1 equipped with a feedback diode for use as an automatic power supply.

As shown in FIG. 2, the preferred circuit may further be equipped with a feedback diode FD1 to enable the battery charger to serve as a power supply for charging a load at negative/positive outputs of the charger and to supply emergency power when the power supply is interrupted.

As with the circuit of FIG. 1, when the circuit of FIG. 2 is initially energized, capacitor C1 is charged and the resulting current flow between the gate of thyristor SCR1 and the negative pole of capacitor C1 switches on thyristor SCR1 and enables the battery B1 to be charged via the normally closed contacts of temperature-sensitive switch TS1. When the battery is almost fully charged and its temperature rises past a predetermined valve, the contacts of switch TS1 open, and current is supplied through branch Z1, which is sufficient to maintain the charge of the battery B1. In this condition, thyristor SCR1 is turned OFF. When the battery temperature falls as a result of the main charging current being cut off by switch TS1, the contacts of switch TS1 close but no charging current flows in capacitor C1, which remains charged. Consequently no current flows from gate G of thyristor SCR1 and the thyristor remains latched OFF. However, on removing battery B1 from the circuit, the capacitor C1 can discharge through branch Z1 and diode CR1, restoring the circuit to its original state so that another battery can be connected for charging as described above.

Feedback diode FD1 is reversely connected in parallel to the negative end of battery B1 at common connection x between the negative end of battery B1 and normally closed temperature controlled switch TS1. Normally, when a load is connected in parallel to the positive end of battery and the negative end of the power supply, the load is driven directly by the power supply. However, when current from the power supply is interrupted, a loop is formed by feedback diode FD1 through the positive terminal of battery 81, enabling the load to be driven by the battery as the battery discharges through diode FD1. Stabilizing capacitance C2 is connected in parallel to the load to stabilize the output during switching from the rectified power source to battery power.

What is claimed is:

1. In a battery charging circuit which includes a thermal cut-off switch arranged to open in order to cut-off a main charging current from a power supply to a rechargeable battery when a temperature sensed by the switch exceeds a predetermined temperature, the improvement comprising:

a semiconductor switching element connected in series between the switch and the power supply;

means including a switch by-pass resistor circuit connected in parallel to the thermal cut-off switch and semiconductor switching element for providing a reduced charging current to the battery when the main changing current is interrupted because the thermal cut-off switch has opened; and means including a latch circuit for preventing said semiconductor switching element from conducting said main charging current to the switch after the switch has closed until the main charging current and reduced charging current are both interrupted, wherein said latch circuit comprises a capacitor connected in parallel to said semiconductor switching element between said switch and said power supply, and also between said switch and a trigger gate of the semiconductor switching element, said capacitor thereby being arranged to charge upon commencement of battery charging in order to switch ON said switching element before said switch has opened, and means for preventing said capacitor from discharging and thereby latching the switching element in an OFF state after the switch has opened irrespective of the state of the thermal cut-off switch, until said interruption of both the main and reduced charging currents.

2. A battery charging circuit as claimed in claim 1, wherein said semiconductor switching element is a thyristor and said means for preventing said capacitor from discharging comprises said switch by-pass resistor circuit connected in parallel to the thermal cut-off switch and thyristor to provide a reduced charging current to the battery when the main charging current is interrupted, said capacitor being arranged to discharge through said resistor circuit and through a diode connected between the capacitor and the resistor circuit when the reduced charging circuit is interrupted.

3. A charger as claimed in claim 1, further comprising means for connecting the power supply to supply power to a load, and a feedback diode connected between the power supply and a terminal of the battery such that when said power supply is interrupted, a circuit is formed through said feedback diode, said battery, and said load to cause said battery to discharge through said load.

* * * * *